(12) United States Patent
Strathmann et al.

(10) Patent No.: US 12,417,373 B2
(45) Date of Patent: Sep. 16, 2025

(54) PERSISTENT MESSAGE PASSING FOR GRAPH NEURAL NETWORKS

(71) Applicant: DeepMind Technologies Limited, London (GB)

(72) Inventors: Heiko Strathmann, London (GB); Mohammadamin Barekatain, London (GB); Charles Blundell, London (GB); Petar Velickovic, Cambridge (GB)

(73) Assignee: DeepMind Technologies Limited, London (GB)

( * ) Notice: Subject to any disclaimer, the term of this patent is extended or adjusted under 35 U.S.C. 154(b) by 769 days.

(21) Appl. No.: 17/829,204

(22) Filed: May 31, 2022

(65) Prior Publication Data

US 2022/0383074 A1 Dec. 1, 2022

Related U.S. Application Data

(60) Provisional application No. 63/230,013, filed on Aug. 5, 2021, provisional application No. 63/194,939, filed on May 28, 2021.

(51) Int. Cl.
*G06N 3/045* (2023.01)
*G06N 3/08* (2023.01)

(52) U.S. Cl.
CPC ............ *G06N 3/045* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 11,521,062 B2 * | 12/2022 | Janssen | G06F 18/214 |
| 2020/0125930 A1 * | 4/2020 | Martin | G06N 3/082 |
| 2021/0049700 A1 * | 2/2021 | Nguyen | G06N 3/044 |
| 2021/0110457 A1 * | 4/2021 | Polania | G06V 20/00 |

FOREIGN PATENT DOCUMENTS

WO  WO-2021226027 A1 * 11/2021 ........... G01S 17/931

OTHER PUBLICATIONS

Strathmann et al., "Persistent Message Passing", Apr. 27, 2021, ArXiv.*
Rangesh et al., "TrackMPNN: A Message Passing Graph Neural Architecture for Multi-Object Tracking", May 7, 2021, arXiv.*
Cappart et al., "Combinatorial optimization and reasoning with graph neural networks," CoRR, Feb. 18, 2021, arXiv:2102.09544, 58 pages.
Deac et al., "XIvin: eXecuted latent value iteration nets," CoRR, Oct. 25, 2020, arXiv:2010.13146, 18 pages.
Driscoll et al., "Making data structures persistent," Journal of Computer and System Sciences, 1986, 38(1):86-124.
Eksombatchai et al., "Pinnersage: Multi-modal user embedding framework for recommendations at pinterest," Proceedings of the 26th ACM SIGKDD International Conference on Knowledge Discovery & Data Mining, Aug. 2020, pp. 2311-2320.

(Continued)

*Primary Examiner* — Amresh Singh
(74) *Attorney, Agent, or Firm* — Fish & Richardson P.C.

(57) ABSTRACT

Methods, systems, and apparatus, including computer programs encoded on computer storage media, for performing persistent message passing using graph neural networks.

20 Claims, 3 Drawing Sheets

(56) References Cited

OTHER PUBLICATIONS

Freivalds et al., "Neural shuffle-exchange networks-sequence processing in O(n log n) time," Advances in Neural Information Processing Systems 32 (NeurIPS 2019), 2019, 12 pages.
Galler et al., "An improved equivalence algorithm," Communications of the ACM, May 1964, 7(5):301-303.
Gilmer et al., "Neural message passing for quantum chemistry," Proceedings of the 34th International Conference on Machine Learning, 2017, 70:1263-1272.
Groß et al., "Directional message passing for molecular graphs," CoRR, Mar. 6, 2020, arXiv:2003.03123, 13 pages.
Hamrick et al., "Relational inductive bias for physical construction in humans and machines," CoRR, Jun. 4, 2018, arXiv:1806.01203, 7 pages.
Hinton, "How to represent part-whole hierarchies in a neural network," Neural Computation, Feb. 17, 2023, 35(3):413-452.
Kingma et al., "Adam: A method for stochastic optimization," CoRR, Dec. 22, 2014, arXiv:1412.6980, 15 pages.
Kruskal et al., "On the shortest spanning subtree of a graph and the traveling salesman problem," Proceedings of the American Mathematical Society, Feb. 1956, 7(1):48-50.
Nair et al., "Solving mixed integer programs using neural networks," CoRR, Dec. 23, 2020, arXiv:2012.13349, 57 pages.
Pfaff et al., "Learning mesh-based simulation with graph networks," CoRR, Oct. 7, 2020, arXiv:2010.03409, 18 pages.
Pritzel et al., "Neural episodic control," Proceedings of the 34th International Conference on Machine Learning, 2017, 70:2827-2836.
Rossi et al., "Temporal graph networks for deep learning on dynamic graphs," CoRR, Jun. 18, 2020, arXiv:2006.10637, 16 pages.
Stokes et al., "A deep learning approach to antibiotic discovery," Cell, Feb. 20, 2020, 180(4):688-702.
Tang et al., "Towards scale-invariant graph-related problem solving by iterative homogeneous graph neural networks," 34th Conference on Neural Information Processing Systems (NeurIPS 2020), 2020, 12 pages.
Tarjan et al., "Efficiency of a good but not linear set union algorithm," Journal of the ACM, Apr. 1975, 22(2):215-225.
Vaswani et al., "Attention is all you need," Advances in Neural Information Processing Systems, 2017, pp. 5998-6008.
Velickovic et al., "Neural execution of graph algorithms," CoRR, Oct. 23, 2019, arXiv:1910.10593, 14 pages.
Velickovic et al., "Pointer graph networks," 34th Conference on Neural Information Processing Systems (NeurIPS 2020), 2020, 13 pages.
Xu et al., "How neural networks extrapolate: From feedforward to graph neural networks," CoRR, Sep. 24, 2020, arXiv:2009.11848, 52 pages.
Xu et al., "What can neural networks reason about?," CoRR, May 30, 2019, arXiv:1905.13211, 18 pages.
Yan et al., "Neural execution engines: Learning to execute subroutines," 34th Conference on Neural Information Processing Systems (NeurIPS 2020), 2020, 11 pages.

\* cited by examiner

PERSISTENT MESSAGE PASSING FOR GRAPH NEURAL NETWORKS

CROSS-REFERENCE TO RELATED APPLICATIONS

This application claims priority to U.S. Provisional Application No. 63/194,939, filed on May 28, 2021, and U.S. Provisional Application No. 63/230,013, filed on Aug. 5, 2021. The disclosures of the prior applications are considered part of and are incorporated by reference in the disclosure of this application.

BACKGROUND

This specification relates to processing data using machine learning models.

Neural networks are machine learning models that employ one or more layers of nonlinear units to predict an output for a received input. Some neural networks include one or more hidden layers in addition to an output layer. The output of each hidden layer is used as input to the next layer in the network, e.g., the next hidden layer or the output layer. Each layer of the network generates an output from a received input in accordance with current values of a respective set of parameters.

SUMMARY

This specification generally describes a system implemented as computer programs on one or more computers in one or more locations that implements a persistent message passing scheme, in which a set of hidden states that is initialized using input graph data is updated over a number of time steps by adding new hidden states to the set rather than over-writing existing hidden states.

The subject matter described in this specification can be implemented in particular embodiments so as to realize one or more of the following advantages.

Graph neural networks (GNNs) have been shown to be a powerful inductive bias for modeling algorithmic reasoning procedures and graph-structured data. Thus far, their performance has been demonstrated on tasks featuring Markovian dynamics, where querying any associated data structure depends only on its latest state.

For many tasks of interest, however, it may be highly beneficial to support efficient data structure queries dependent on previous states and connectivity. This requires tracking the data structure's evolution through time, placing significant pressure on the GNN's representations. Thus, conventional GNN approaches are unable to perform well at these types of tasks.

This specification describes Persistent Message Passing (PMP), a mechanism which endows GNNs with the capability to query a past state of itself by explicitly persisting it: rather than overwriting node representations, PMP creates new nodes ("hidden states") whenever required.

This specification describes versions of PMP for both static and dynamic graphs, where the latter involves persisting inferred connectivity structure in addition to node states. PMP significantly improves performance of existing GNNs on any of a variety of tasks defined on both static and dynamically changing graph structures.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that performs operations on an input graph in order to provide responses to query inputs.

Figure 1:
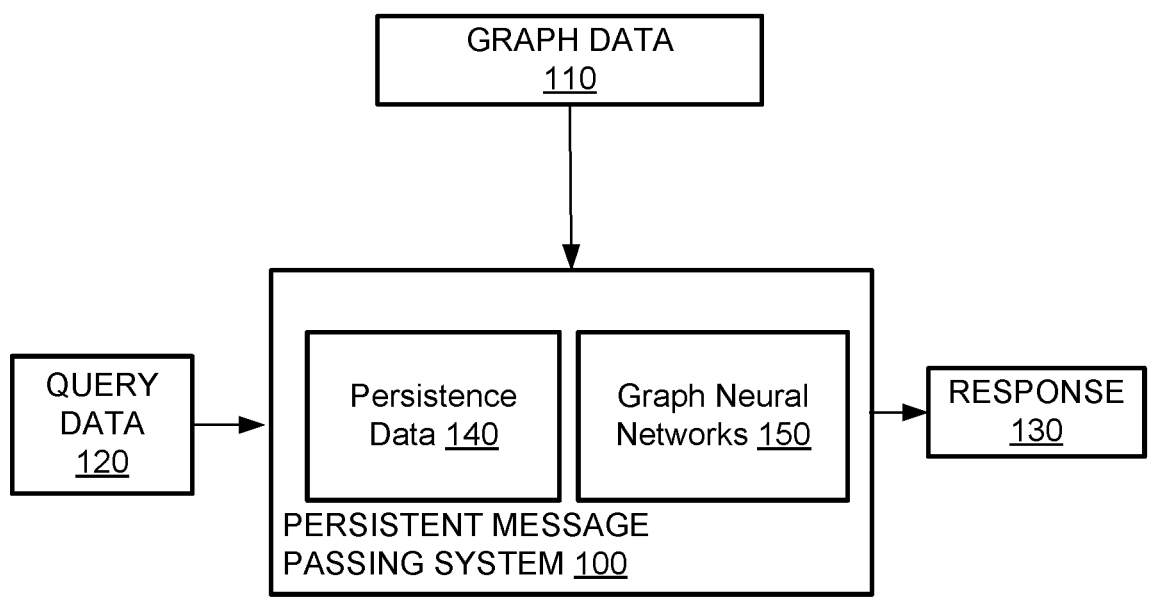
FIG. 1 is a diagram of an example persistent message passing system.

FIG. 1 is a diagram of an example persistent message passing system 100. The persistent message passing system 100 is an example of a system implemented as computer programs on one or more computers in one or more locations, in which the systems, components, and techniques described below can be implemented.

The system 100 receives as input graph data 110 that defines a graph that includes a set of nodes and a set of edges. Each node in the set of nodes represents a respective entity from the set of entities and each edge in the current set of edges connects a pair of nodes.

As used throughout this specification, a "graph" refers to a data structure that includes at least: (i) a set of nodes, and (ii) a set of edges. Each edge in the graph can connect a pair of nodes in the graph. The graph can be a "directed" graph, e.g., such that each edge that connects a pair of nodes is defined as pointing from the first node to the second node or vice versa, or an "undirected" graph, e.g., such that the edges are not associated with directions.

Data defining a graph can include data defining the nodes and the edges of the graph, and can be represented in any appropriate numerical format. For example, a graph can be defined by an adjacency matrix that includes a number of rows and a number of columns equal to the number of nodes in the graph. Each entry (i,j) in the adjacency matrix can have value 1 (or some other predefined value) if the graph includes an edge connecting node i and node j, and value 0 (or some other predefined value) otherwise. As another example, a graph can be defined by a set of tuples $\{(i,j)\}$, where each tuple (i,j) represents an edge in the graph connecting the node i and node j.

The system 100 also receives query inputs 120 at each of multiple time steps. Each query input includes information characterizing the nodes in the graph. For example, the query input can include a respective feature vector for each node in the graph that represents, e.g., an update to the entity represented by the node or a query about the state of the entity represented by the node.

The system 100 uses the graph data 110 to generate a response 130 to each of the query inputs 120. The response 130 is a vector or other tensor of numerical values and can be, e.g., parsed or otherwise mapped by the system that submitted the query in order to generate a natural language output or another type of output that is appropriate for the task that the system 100 is configured to perform.

In particular, the query inputs 120 include not only information characterizing the nodes in the graph but also identify a time step that is relevant to the query input 120.

The time step identified by a given query input 120 can be the current time step at which the given query input 120 is received, but can also be an earlier time step that is earlier than the current time step. Moreover, the task performed by the system 100 can require the system to provide a response 130 that characterizes the state of the graph at the time step that is identified in the query input 120, e.g., when only the information at the query inputs up to the identified time step had been received.

Thus, the system 100 may be required to generate responses 130 to query inputs 120 that require access to information characterizing the past state of the graph.

Generally, the system 100 is able to provide responses 130 to query inputs 120 that can be parsed or otherwise mapped to outputs for the task by virtue of being trained on training data for the task. That is, even though, as described above, each query input 120 can include a respective feature vector for each node in the graph and not an explicitly query, the system 100 can provide a response 130 for the task that is relevant to the time step identified in the query input 120 by virtue of having been trained on the training data for the task.

This training is described in more detail below with reference to FIG. 3.

To effectively generate responses, the system 100 implements a persistent message passing scheme, in which a set of hidden states that is initialized using the input graph data 110 is updated over a number of time steps by adding new hidden states to the set rather than over-writing existing hidden states. By not over-writing existing hidden states and by maintaining persistence data 140 that allows the system to track back to a given earlier graph state, the system 100 can effectively generate responses 130 to query inputs 120 about the current state of the graph and about query inputs about the past state of the graph.

In particular, the system 100 initializes persistence data 140 that is updated at each time step (rather than updating the graph data 110) so that previous graph states are persisted in the persistence data 140.

At each time step, the system uses the persistence data 140 and a set of graph neural networks 150 to generate the response 130 to the query input 120 received at the time step.

The operation of the system 100 is described in more detail below with reference to FIGS. 2 and 3.

The system 100 is widely applicable and is not limited to one specific implementation. However, for illustrative purposes, a small number of example implementations are described below.

In particular, the graph can represent any underlying system over time, as a respective input or update is applied to the graph (and, therefore, the system) at each of a number of future time steps and the system can predict the output of a query that would be applied to the graph at a specified time step that may be before the current time step.

In some implementations, the graph can represent a molecule, each node in the graph can represent a respective atom in the molecule, and the query can be a request for data relating to one or more predicted properties of the molecule at the corresponding time step, e.g., the equilibrium energy of the molecule, the energy required to break up the molecule, or the charge of the molecule, or a specific relationship between atoms in the molecule at the query time step. Thus, the response generated by the system is a vector or other tensor that represented the value of the one or more predicted properties.

In some implementations, the graph can represent a state tree of an environment being interacted with by an agent, e.g., a real-world environment being interacted with by a robot, autonomous vehicle, or other mechanical agent to perform a task, an each node in the graph can represent a respective state of the environment. Across time steps, nodes can be updated to represent a search through the state tree, e.g., as part of a planning process to select an action to be performed by the agent, and the queries can represent queries to identify whether two nodes were connected at earlier time steps during the search. The output of the queries can then be used to select the action to be performed by the agent, e.g., to cause the agent to act in the environment.

In some implementations, the graph can represent a social network (e.g., on a social media platform), each node in the graph can represent a respective person in the social network, each edge in the graph can represent, e.g., a relationship between two corresponding people in the social network (e.g., a "follower" or "friend" relationship), and the prediction can predict, e.g., which nodes are within some "distance" of each other at the query time step. Because social media relationships change over time, the system can be used to query past relationships of people on the social network.

In some implementations, the graph can represent a physical system, each node in the graph can represent a respective object in the physical system, and the query can be a request for data relating to the physical system at the query time step, e.g., a respective state of one or more objects in the physical system as of the time step, e.g., a respective position and/or velocity of each of one or more objects in the physical system at the time step.

In some implementations, the graph can represent a point cloud (e.g., generated by a lidar or radar sensor), each node in the graph can represent a respective point in the point cloud, and the prediction can predict a class of object represented by the point cloud at the time step.

In some implementations, the graph can represent an environment in the vicinity of a partially- or fully-autonomous vehicle, each node in the graph can represent a respective agent in the environment (e.g., a pedestrian, bicyclist, vehicle, etc.) or an element of the environment (e.g., traffic lights, traffic signs, road lanes, etc.), and the prediction can predict, e.g., a respective property of one or more agents at the query time step.

In some implementations, the graph can represent a road network, each node in the graph can represent a route segment in the road network, each edge in the graph can represent that two corresponding route segments are connected in the road network, and the task prediction can predict, e.g., a time required to traverse a specified path through the road network given current information about the state of the route segments in the road network, or a time required to traverse a specified path through the road network given past information about the state of the route segments in the road network.

In some implementations, the graph can represent a protein, each node in the graph can represent a respective amino acid in the amino acid sequence of the protein, and each edge in the graph can represent that two corresponding amino acids in the protein are separated by less than a threshold distance (e.g., 8 Angstroms) in a structure of the protein. In these implementations, the prediction can predict, e.g., a stability of the protein, or a function of the protein as of the query time step.

Figure 2:
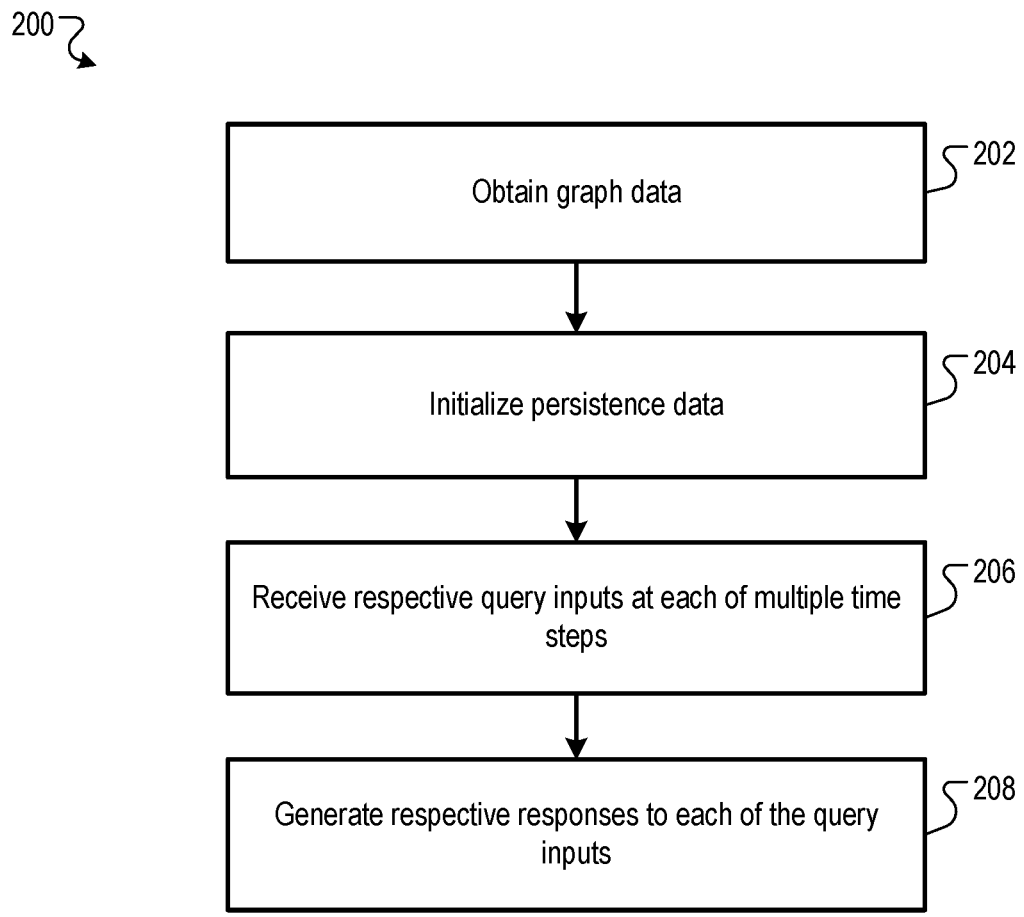
FIG. 2 is a flow diagram of an example process for generating responses to query inputs.

FIG. 2 is a flow diagram of an example process 200 for updating hidden states in order to respond to queries about a set of entities. For convenience, the process 200 will be described as being performed by a system of one or more computers located in one or more locations. For example, a persistent message passing system, e.g., the persistent message passing system 100 depicted in FIG. 1, appropriately programmed in accordance with this specification, can perform the process 200.

The system obtains graph data defining a graph that includes (i) a set of nodes that represents a respective entity from a set of entities and (ii) a current set of edges, where each edge in the current set of edges connects a respective pair of nodes (step 202).

As described above, the graph data can represent relationships between any of a variety of sets of entities.

The system initializes, using the graph data, persistence data (step 204).

The persistence data includes a set of hidden states.

Generally, each hidden state is a vector of numeric values that characterizes one of the nodes in the graph. In particular, when initialized, the set includes only a respective default hidden state for each node. A "default" hidden state can include all zero entries or all entries that are all randomly selected or garbage values.

For each hidden state, the persistence data also includes data identifying a corresponding node in the graph, e.g., the node characterized by the hidden state, and a corresponding time step at which the hidden state was added to the set of hidden states.

The persistence data also includes connectivity data that identifies a connectivity between hidden states in the set of hidden states. To initialize this data, the system can generate data that indicates, for any given node in the graph, that the hidden state that corresponds to the given node is connected to each other hidden state that corresponds to another node that is connected to the given node by an edge in the graph.

The persistence data also includes relevance data that identifies hidden states that are relevant to other hidden states in the set of hidden states. To initialize this data, the system generate data that indicates that the default hidden states are not relevant to any other hidden states.

The system can represent the relevance data and the connectivity data as, e.g., respective binary-valued adjacency matrices.

At each particular time step of a plurality of time steps, the system receives query data that includes (i) a set of one or more input feature vectors that represent information about the set of entities and (ii) a query time step identifier that identifies a query time step that are relevant to the input feature vectors (step 206). For example, the information can represent a query about one or more of the entities at the query time step, updates to one or more of the entities, or both. The query time steps can be time steps that are earlier than the particular time step, requiring the system to "remember" the past state of the set of entities in order to respond to the query.

In some implementations, the query input can include a respective input feature vector for each node in the graph data, e.g., but not for each hidden state in the set of hidden states if the system has already added one or more hidden states to the set at earlier time steps.

At each of the particular time steps, the system generates a response to the query data using the persistence data and updates the persistence data for use at the next time step (step 208). Generally, when updating the persistence data, the system does not modify or over-write any of the hidden states that are already in the set. Additionally, the system only adds new hidden states corresponding to a proper subset of the existing hidden states, greatly improving the memory-efficiency of the system.

More specifically, the system selects, using the query input and the persistence data, a first proper subset of the hidden states as relevant hidden states for the time step.

The system then generates a respective candidate new hidden state for at least the relevant hidden states.

The system also selects, as next step hidden states, a second proper subset of the hidden states and adds, to the set of hidden states, only the respective candidate new hidden states for the next state hidden states.

The system also generates, using at least the relevant hidden states for the time step, a prediction output in response to the query data that characterizes one or more of the entities in the set as of the query time step.

This is described in more detail below with reference to FIG. 3.

Figure 3:
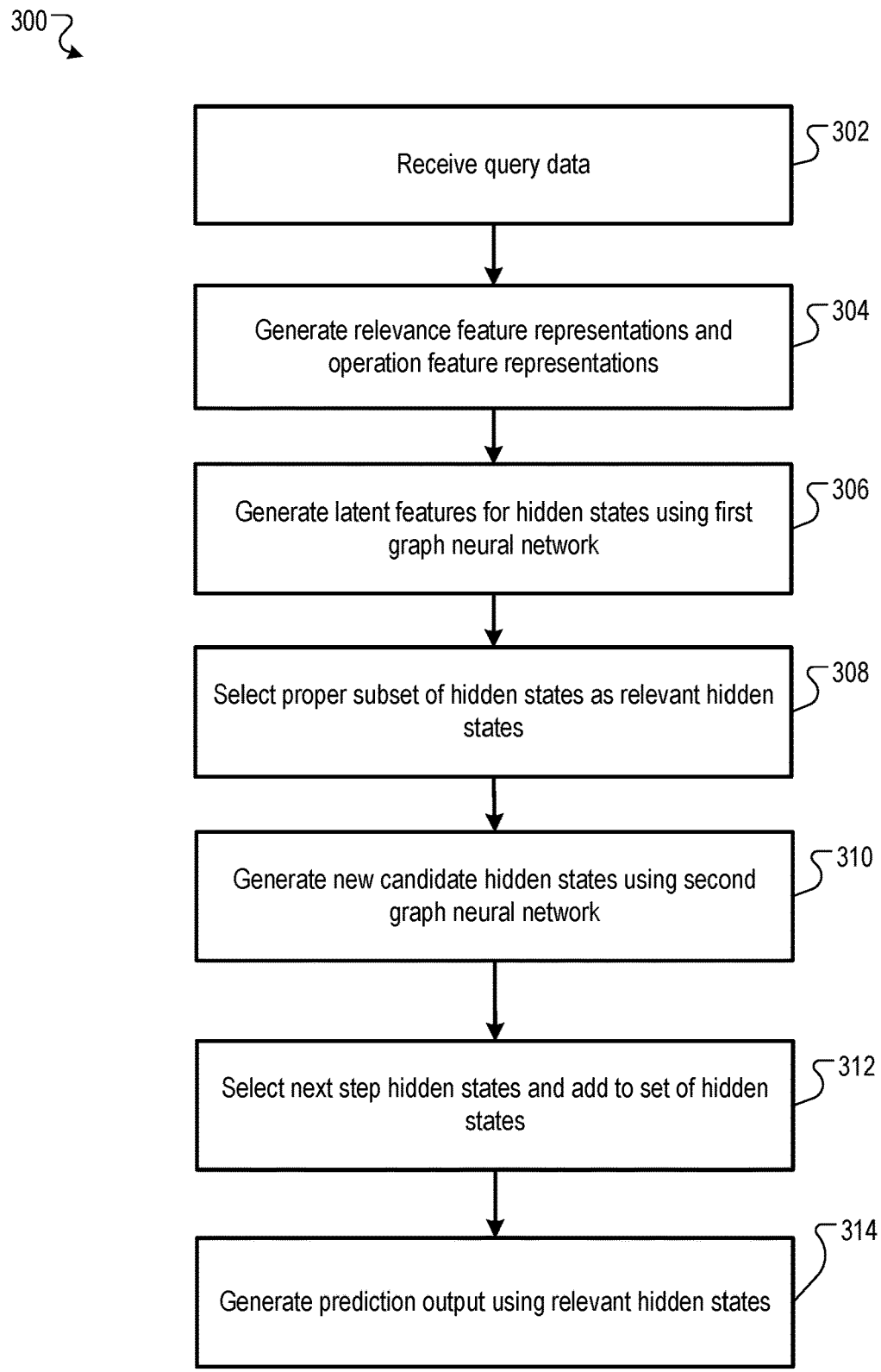
FIG. 3 is a flow diagram of an example process for generating a response to a query input at a given time step.

FIG. 3 is a flow diagram of an example process 300 for generating a response to a query at a particular time step. For convenience, the process 300 will be described as being performed by a system of one or more computers located in one or more locations. For example, a persistent message passing system, e.g., the persistent message passing system 100 depicted in FIG. 1, appropriately programmed in accordance with this specification, can perform the process 300.

The system can perform the process 300 at each of multiple time steps in order to respond to a query at each of the multiple time steps. In particular, at any given time step, the system can respond to queries about the state of the hidden states at the given time step or at any preceding time step. Thus, a user of the system can query the system about past states, even when those states have subsequently been modified at later time steps.

The system receives query data that includes (i) a set of one or more input feature vectors that represent information about the set of entities and (ii) a query time step identifier that identifies a query time step that is relevant to the input feature vectors (step 302).

The system generates, from the query data and the persistence data, a respective relevance feature representation and a respective operation feature representation for each hidden state in the set of hidden states (step 304).

To generate the relevance feature representations for the hidden states, the system can, for each hidden state in the set, process an input generated from (i) the query time step identifier and (ii) the data identifying the time step at which the hidden state was added to the set of hidden states using a relevance neural network to generate the respective relevance feature representation for the hidden state.

For example, the relevance neural network can be a multi-layer perceptron (MLP) or a single-layer, learned linear transformation.

In some cases, the input is also generated from (iii) data identifying the current time step, e.g., the particular time step at which the current iteration of the process 300 is being performed.

In these cases, the relevance feature representation $v_j^{(t)}$ for a hidden state $h_j$ at in the set of hidden states at current time step t can satisfy:

$$v_j^{(t)} = f_{relevance}(t, t_j, s^{(t)}),$$

where $t_j$ is the time step at which the hidden state $h_j$ was added to the set of hidden states, $s^{(t)}$ is the query time step identifier received at the time step t, and $f_{relevance}$ is the relevance neural network.

To generate the operation feature representations for the hidden states, for each hidden state in the set, the system processes an input that is generated from the hidden state and the set of one or more input feature vectors using an operation neural network to generate the respective operation feature representation for the hidden state.

For example, the operation neural network can be an MLP or a single-layer, learned linear transformation.

As described above, in some implementations, the set of one or more input feature vectors includes a respective input feature vector for each node in the graph. In these implementations, to generate the input, the system generates a set of expanded feature vectors that includes a respective expanded feature vector for each hidden state that is equal to the input feature vector for the corresponding node in the graph for the hidden state. Thus, when two hidden states correspond to the same node in the graph, the two hidden states will have the same expanded feature vector and that feature vector will be equal to the input feature vector for the corresponding node.

In these cases, the operation feature representation $z_j^{(t)}$ for a hidden state $h_j$ at in the set of hidden states at current time step t can satisfy:

$$z_j^{(t)} = f_{operation}(\text{expand}(\varepsilon^{(t)}), h_j),$$

where $f_{relevance}$ is the relevance neural network, $\varepsilon^{(t)}$ is the set of input feature vectors, and expand is the expand operation that identifies the input feature vector in the set that corresponds to the same node as the hidden state $h_j$.

The system processes the respective relevance feature representations for the hidden states in the set of hidden states and the relevance data using a first graph neural network to generate a respective relevance latent feature for each hidden state in the set (step 306). For example, the set $g_1^{(t)}, g_2^{(t)}, \ldots, g_{N^{(t)}}^{(t)}$ of relevance latent features for the $N^{(t)}$ hidden states in the set as of time step t can satisfy:

$$g_1^{(t)}, g_2^{(t)}, \ldots, g_{N^{(t)}}^{(t)} = P_{relevance}(V^{(t)}, \Lambda^{(t)}),$$

where $P_{relevance}$ is the first graph neural network, $V^{(t)}$ is the set of relevance feature representations, and $\Lambda^{(t)}$ is the relevance data as of time step t represented as an adjacency matrix.

The first graph neural network can have any appropriate graph neural network architecture, e.g., can be any appropriate graph neural network that includes one or more graph neural network layers that each update received feature representations for a set of data items based on relationships between the data items (e.g., based on the relevance data). The graph neural network layers can apply any of a variety of message passing techniques to update the feature representations. Examples include those employed by Graph Attention Networks, Message Passing Neural Networks, Graph Convolutional Networks, and so on.

The system selects, using the respective relevance latent features, a first proper subset of the hidden states as relevant hidden states for the time step (step 308).

In particular, for each hidden state, the system can process the respective relevance feature for the hidden state using a relevance masking neural network that is configured to generate a relevance masking output that indicates whether the hidden state should be included in the first proper subset. For example, the relevance masking neural network can be an MLP or a single linear layer that processes the relevance feature to generate a score that is between zero and one and the system can determine to include the hidden state in the first proper subset if the score for the hidden state exceeds a threshold value, e.g., 0.5. That is, the system can generate a relevance mask $\mu^{(t)}$ that assigns a mask value $\mu_j^{(t)}$ to each hidden state $h_j$ that is equal to zero if the hidden state is not in the first proper subset and is equal to one if the hidden state is in the first proper subset.

The system processes the respective operation feature representations for the hidden states in the set of hidden states, the connectivity data, and data identifying the first proper subset using a second graph neural network to generate a respective candidate new hidden state for each hidden state in the set (step 310).

In particular, the system can first generate masked connectivity data by masking the connectivity data to remove at least connections that do not include any relevant hidden states. The system can then process the respective operation feature representations and the masked connectivity data using the second graph neural network to generate a respective candidate new hidden state for each hidden state in the set.

That is, the set $\hat{H}^{(t)} = \hat{h}_1^{(t)}, \hat{h}_2^{(t)}, \ldots, \hat{h}_{N^{(t)}}^{(t)}$ of candidate new hidden states for the $N^{(t)}$ hidden states in the set as of time step t can satisfy:

$$\hat{H}^{(t)} = P_{operation}(Z^{(t)}, \text{mask}(\Pi^{(t)}, \mu^{(t)})),$$

where $P_{operation}$ is the second graph neural network, $V^{(t)}$ is the set of operation feature representations, $\Pi^{(t)}$ is the connectivity data as of time step t represented as an adjacency matrix, and the mask operation removes connections that do not include any hidden states that are assigned a one in the mask $\mu^{(t)}$.

The second graph neural network can have any appropriate graph neural network architecture, e.g., can be any appropriate graph neural network that includes one or more graph neural network layers that each update received feature representations for a set of data items based on relationships between the data items (e.g., based on the masked connectivity data). The graph neural network layers can apply any of a variety of message passing techniques to update the feature representations. Examples include those employed by Graph Attention Networks, Message Passing Neural Networks, Graph Convolutional Networks, and so on.

The system selects, as next step hidden states, a second proper subset of the hidden states (step 312).

To select the next step hidden states, the system can, for each relevant hidden state, process the candidate new hidden state for the relevant hidden state using a persistency masking neural network configured to generate a persistency masking output that indicates whether the relevant hidden state should be included in the second proper subset.

For example, the persistency masking neural network can be an MLP or a single linear layer that processes the candidate new hidden state to generate a score that is between zero and one and the system can determine to include the hidden state in the second proper subset if the score for the hidden state exceeds a threshold value, e.g., 0.5.

The system then selects, as a next step hidden state, each relevant hidden state at the time step for which the persistency masking output indicates that the relevant hidden state should be included in the second proper subset.

That is, the system can generate a persistency mask $\varphi^{(t)}$ that assigns a mask value $\varphi_j^{(t)}$ to each hidden state $h_j$ that is equal to zero if the hidden state is not in the second proper subset and is equal to one if the hidden state is in the second proper subset.

The system then adds, to the set of hidden states, only the respective candidate new hidden states for the next state hidden states. That is, the system can add a given candidate new hidden state $\hat{h}_j^{(t)}$ to the set of hidden states only if both $\varphi_j^{(t)}$ and $\mu_j^{(t)}$ are equal to 1.

The system generates, using at least the relevant hidden states for the time step, a prediction output in response to the query data that characterizes one or more of the entities in the set as of the query time step (step 314).

For example, the system can apply an aggregation operation to the candidate new hidden states corresponding to the relevant hidden states for the time step, e.g., the states for which $\mu_j^{(t)}$ is equal to 1, to generate an aggregated relevant hidden state and process an input that includes the aggregated hidden state using a readout neural network to generate the prediction output. The readout neural network can be, e.g., an MLP or other feedforward neural network.

In some cases, the system also applies the aggregation operation to the respective operation feature representations for the relevant hidden states for the time step to generate an aggregated operation feature representation and include the aggregated operation feature representation in the input to the readout neural network. For example, the input to the readout neural network input can be a concatenation or a sum of the aggregated operation feature representation and aggregated relevant hidden state.

The system can use any of a variety of aggregation operations that combine multiple feature representations into a single representation. For example, the aggregation operation can be the maximum operation, mean operation, or the minimum operation.

The system updates the maintained persistence data to reflect the new hidden states that were added at the given time step (step 316).

In particular, in addition to adding the new candidate hidden states to the set of hidden states, the system also updates the persistence data to indicate that each candidate new hidden state that was added to the set of hidden states corresponds to the same node as the corresponding hidden state and to indicate that each candidate new hidden state was added to the set of hidden states at the current time step. That is, as described above, each candidate new hidden state corresponds to one of the hidden states that was already in the set at the beginning of the current iteration of the process 300. The system updates the data to indicate that each candidate new hidden state that was added to the set of hidden states corresponds to the same node as its corresponding hidden state.

The system also updates the connectivity data to indicate that each particular candidate new hidden state that was added has the same connectivity as the corresponding hidden state, e.g., is connected to the same hidden states as the corresponding hidden states.

The system also updates the relevance data to indicate that each particular candidate new hidden state that was added is relevant to the corresponding hidden state.

In some implementations, the connectivity of the input graph is static, e.g., the system does not add any edges to the input graph after the graph data is received prior to the initial time step.

In some other implementations, the input graph is a dynamic graph and the connectivity of the input graph is dynamic, e.g., the system can add edges to the graph at any particular time step in order to generate more accurate responses at subsequent time steps.

In these implementations, the system determines whether and, if so, how, to add additional connectivity for each particular one of the respective candidate new hidden states that were added to the set of hidden states.

In particular, for each particular one of these candidate new hidden states, the system can apply self-attention over the respective candidate new hidden states that were added to the set of hidden states to generate a respective pointer score for each of the other respective candidate new hidden states that were added and then update the connectivity data to include connectivity data for the particular candidate new hidden state using the respective pointer scores.

As part of this updating, the system can select one or more of the other respective candidate new hidden states that were added to be connected to the particular one of the respective candidate new hidden states that were added using the pointer scores and update the connectivity data to indicate that each selected other respective candidate new hidden state is connected to the particular one of the respective candidate new hidden states.

That is, the system can estimate the probability $\alpha_{ij}^{(t)}$ of hidden state i pointing to hidden state j using self-attention as:

$$q_i^{(t)} = W_q h_i^{(t)} k_i^{(t)} = W_k h_i^{(t)} \alpha_{ij}^{(t)} = \text{softmax}_j ((q_i^{(t)})^T k_j^{(t)})$$

where the Ws are learned weight matrices, and then select $\text{argmax}_k \alpha_{ik}^{(t)}$ as the candidate next-step pointer of hidden state i.

For each hidden state added to the graph at time step t, e.g., each candidate new hidden state for which both $\varphi_j^{(t)}$ and $\mu_j^{(t)}$ are equal to 1, the system uses the next-step candidate pointers to generate the corresponding new rows in $\Pi^{(t+1)}$, also adjusting pointers into nodes which also have been persisted to their new version, as done in the static case above.

For incoming connections, because the system needs to persist hidden states on incoming paths in order to guarantee persistence of the graph connectivity structure, the system extends the set of to-be-persisted hidden states recursively to:

$$\bigcup_{i \in \{i : \psi_i \phi_i = 1\}} p(i) \text{ where } p(i) := \{i\} \cup \bigcup_{\{j : \Pi_{ji}^{(t)} = 1\}} p(j)$$

In practice, if the graph neural networks use only a single message passing step to aggregate neighbouring information across the graph, the system can truncate longer incoming paths (e.g., only recurse once in the above recursion)) without affecting computation carried out on past states.

The system or a different training system can train the all of the neural networks used by the system, e.g., both graph neural networks, the readout neural network, the relevance neural network, the operation neural network, and so on, jointly on training data through supervised learning. In particular, the system can train the neural networks on training examples that include (i) an input graph, (ii) a sequence of query inputs, and (iii) a ground truth response to each query input. The system can then train the neural networks through supervised learning to optimize an objective, e.g., to minimize a loss function, that includes one or more terms that measure, for each query input in the sequence, an error, e.g., a cross-entropy loss, between the response generated by the system in response the query input and the ground truth response to the query input. Optionally, the training data examples also include ground truth relevant and persisted hidden states for each time step, and the objective can also measure errors between which hidden states were deemed relevant and persisted in response to each query input and the ground truth hidden states.

Thus, in the dynamic graphs implementations, because the self-attention mechanism is trained jointly with the other neural network components used by the system, the system can generate new connections only when it will likely improve the accuracy of responses to future query inputs.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for generating prediction outputs characterizing a set of entities, the method comprising:

obtaining graph data defining a graph comprising: (i) a set of nodes, wherein each node in the set of nodes represents a respective entity from the set of entities and (ii) a current set of edges, wherein each edge in the current set of edges connects a pair of nodes;

initializing, using the graph data, persistence data that includes (i) a set of hidden states, (ii) for each hidden state, data identifying a corresponding node in the graph and a corresponding time step at which the hidden state was added to the set of hidden states, (iii) connectivity data that identifies a connectivity between hidden states in the set of hidden states, and (iv) relevance data that identifies hidden states that are relevant to other hidden states in the set of hidden states; and at each particular time step of a plurality of time steps:
receiving query data comprising (i) a set of one or more input feature vectors that represent information about the set of entities and (ii) a query time step identifier that identifies a time step that is relevant to the input feature vectors;

generating, from the query data and the persistence data, a respective relevance feature representation and a respective operation feature representation for each hidden state in the set of hidden states;

processing the respective relevance feature representations for the hidden states in the set of hidden states and the relevance data using a first graph neural network to generate a respective relevance latent feature for each hidden state in the set;

selecting, using the respective relevance latent features, a first proper subset of the hidden states as relevant hidden states for the time step;

processing the respective operation feature representations for the hidden states in the set of hidden states, the connectivity data, and data identifying the proper subset using a second graph neural network to generate a respective candidate new hidden state for each hidden state in the set;

selecting, as next step hidden states, a second proper subset of the hidden states;

adding, to the set of hidden states, only the respective candidate new hidden states for the next state hidden states; and generating, using at least the relevant hidden states for the time step, a prediction output in response to the query data that characterizes one or more of the entities in the set as of the query time step.

2. The method of claim 1, wherein generating, from the query data and the persistence data, a respective relevance feature representation for each hidden state in the set of hidden states comprises:

for each hidden state in the set, processing an input generated from the query time step identifier and the data identifying the time step at which the hidden state was added to the set of hidden states using a relevance neural network to generate the respective relevance feature representation for the hidden state.

3. The method of claim 2, wherein the input is further generated from data identifying the particular time step.

4. The method of claim 1, wherein generating, from the query data and the persistence data, a respective operation feature representation for each hidden state in the set of hidden states comprises:

for each hidden state in the set, processing an input generated from the hidden state and the set of one or more input feature vectors using an operation neural network to generate the respective operation feature representation for the hidden state.

5. The method of claim 4, wherein the set of one or more input feature vectors comprises a respective input feature vector for each node in the graph and wherein generating the input comprises generates a set of expanded feature vectors that includes a respective expanded feature vector for each hidden state that is equal to the input feature vector for the corresponding node in the graph for the hidden state.

6. The method of claim 1, wherein selecting, using the respective relevance latent features, a first proper subset of the hidden states as relevant hidden states for the time step, comprises, for each hidden state:

processing the respective relevance feature using a relevance masking neural network configured to generate a relevance masking output that indicates whether the hidden state should be included in the first proper subset.

7. The method of claim 1, wherein processing the respective operation feature representations for the hidden states in the set of hidden states, the connectivity data, and data identifying the proper subset using a second graph neural network to generate a respective candidate new hidden state for each hidden state in the set comprises:

generating masked connectivity data by masking the connectivity data to remove at least connections that do not include any relevant nodes; and processing the respective operation feature representations and the masked connectivity data using the second graph neural network.

8. The method of claim 1, wherein selecting, as next step hidden states, a second proper subset of the hidden states comprises, for each relevant hidden state:

processing the candidate new hidden state for the relevant hidden state using a persistency masking neural network configured to generate a persistency masking output that indicates whether the relevant hidden state should be included in the second proper subset; and selecting, as a next step hidden state, each relevant hidden state at the time step for which the persistency masking output indicates that the relevant hidden state should be included in the second proper subset.

9. The method of claim 1, wherein generating a prediction output in response to the query received at the time step from at least the hidden states for the relevant hidden states for the time step comprises:

applying an aggregation operation to the candidate new hidden states for the relevant hidden states for the time step to generate an aggregated relevant hidden state; and processing an input comprising the aggregated hidden state using a readout neural network to generate the prediction output.

10. The method of claim 9, wherein generating a prediction output in response to the query received at the time step from at least the hidden states for the relevant hidden states for the time step further comprises:

applying the aggregation operation to the respective operation feature representations for the relevant hidden states for the time step to generate an aggregated operation feature representation; and wherein the input to the readout neural network further comprises the aggregated operation feature representation.

11. The method of claim 1, the method further comprising:

at each particular time step of the plurality of time steps:
updating the persistence data to indicate that each candidate new hidden state that was added to the set of hidden states corresponds to the same node as the corresponding hidden state and to indicate that each candidate new hidden state was added to the set of hidden states at the particular time step.

12. The method of claim 1, the method further comprising:

at each particular time step of the plurality of time steps:
updating the connectivity data to indicate that each particular candidate new hidden state that was added has a same connectivity as the corresponding hidden state.

13. The method of claim 1, further comprising:

at each particular time step of the plurality of time steps:
updating the relevance data to indicate that each particular candidate new hidden state that was added is relevant to the corresponding hidden state.

14. The method of claim 1, further comprising:

at each particular time step of the plurality of time steps and for each particular one of the respective candidate new hidden states that were added to the set of hidden states:

applying self-attention over the respective candidate new hidden states that were added to the set of hidden states to generate a respective pointer score for each of the other respective candidate new hidden states that were added; and updating the connectivity data to include connectivity data for the particular candidate new hidden state using the respective pointer scores.

15. The method of claim 14, wherein the updating comprises:

selecting one or more of the other respective candidate new hidden states that were added to be connected to the particular one of the respective candidate new hidden states that were added; and updating the connectivity data to indicate that each selected other respective candidate new hidden state is connected to the particular one of the respective candidate new hidden states.

16. One or more non-transitory computer storage media storing instructions that when executed by one or more computers cause the one or more computers to perform operations for generating prediction outputs characterizing a set of entities, the operations comprising:
  obtaining graph data defining a graph comprising: (i) a set of nodes, wherein each node in the set of nodes represents a respective entity from the set of entities and (ii) a current set of edges, wherein each edge in the current set of edges connects a pair of nodes;
  initializing, using the graph data, persistence data that includes (i) a set of hidden states, (ii) for each hidden state, data identifying a corresponding node in the graph and a corresponding time step at which the hidden state was added to the set of hidden states, (iii) connectivity data that identifies a connectivity between hidden states in the set of hidden states, and (iv) relevance data that identifies hidden states that are relevant to other hidden states in the set of hidden states; and
  at each particular time step of a plurality of time steps:
    receiving query data comprising (i) a set of one or more input feature vectors that represent information about the set of entities and (ii) a query time step identifier that identifies a time step that is relevant to the input feature vectors;
    generating, from the query data and the persistence data, a respective relevance feature representation and a respective operation feature representation for each hidden state in the set of hidden states;
    processing the respective relevance feature representations for the hidden states in the set of hidden states and the relevance data using a first graph neural network to generate a respective relevance latent feature for each hidden state in the set;
    selecting, using the respective relevance latent features, a first proper subset of the hidden states as relevant hidden states for the time step;
    processing the respective operation feature representations for the hidden states in the set of hidden states, the connectivity data, and data identifying the proper subset using a second graph neural network to generate a respective candidate new hidden state for each hidden state in the set;
    selecting, as next step hidden states, a second proper subset of the hidden states;
    adding, to the set of hidden states, only the respective candidate new hidden states for the next state hidden states; and
    generating, using at least the relevant hidden states for the time step, a prediction output in response to the query data that characterizes one or more of the entities in the set as of the query time step.

17. A system comprising:
  one or more computers; and
  one or more storage devices storing instructions that, when executed by the one or more computers, cause the one or more computers to perform operations for generating prediction outputs characterizing a set of entities, the operations comprising:
    obtaining graph data defining a graph comprising: (i) a set of nodes, wherein each node in the set of nodes represents a respective entity from the set of entities and (ii) a current set of edges, wherein each edge in the current set of edges connects a pair of nodes;
    initializing, using the graph data, persistence data that includes (i) a set of hidden states, (ii) for each hidden state, data identifying a corresponding node in the graph and a corresponding time step at which the hidden state was added to the set of hidden states, (iii) connectivity data that identifies a connectivity between hidden states in the set of hidden states, and (iv) relevance data that identifies hidden states that are relevant to other hidden states in the set of hidden states; and
    at each particular time step of a plurality of time steps:
      receiving query data comprising (i) a set of one or more input feature vectors that represent information about the set of entities and (ii) a query time step identifier that identifies a time step that is relevant to the input feature vectors;
      generating, from the query data and the persistence data, a respective relevance feature representation and a respective operation feature representation for each hidden state in the set of hidden states;
      processing the respective relevance feature representations for the hidden states in the set of hidden states and the relevance data using a first graph neural network to generate a respective relevance latent feature for each hidden state in the set;
      selecting, using the respective relevance latent features, a first proper subset of the hidden states as relevant hidden states for the time step;
      processing the respective operation feature representations for the hidden states in the set of hidden states, the connectivity data, and data identifying the proper subset using a second graph neural network to generate a respective candidate new hidden state for each hidden state in the set;
      selecting, as next step hidden states, a second proper subset of the hidden states;
      adding, to the set of hidden states, only the respective candidate new hidden states for the next state hidden states; and
      generating, using at least the relevant hidden states for the time step, a prediction output in response to the query data that characterizes one or more of the entities in the set as of the query time step.

18. The system of claim 17, wherein generating, from the query data and the persistence data, a respective relevance feature representation for each hidden state in the set of hidden states comprises:
  for each hidden state in the set, processing an input generated from the query time step identifier and the data identifying the time step at which the hidden state was added to the set of hidden states using a relevance neural network to generate the respective relevance feature representation for the hidden state.

19. The system of claim 18, wherein the input is further generated from data identifying the particular time step.

20. The system of claim 17, wherein generating, from the query data and the persistence data, a respective operation feature representation for each hidden state in the set of hidden states comprises:
  for each hidden state in the set, processing an input generated from the hidden state and the set of one or more input feature vectors using an operation neural network to generate the respective operation feature representation for the hidden state.

\* \* \* \* \*